US008081578B2

(12) United States Patent
Adam et al.

(10) Patent No.: US 8,081,578 B2
(45) Date of Patent: Dec. 20, 2011

(54) METHODS, SYSTEMS, AND COMPUTER READABLE MEDIA FOR AUTOMATICALLY CATEGORIZING VOICE OVER INTERNET PROTOCOL (VOIP) SUBSCRIBER DEVICES IN ACCORDANCE WITH VOIP TEST AND CALL QUALITY DATA

(75) Inventors: Richard L. Adam, Lancaster, CA (US); Carl Mottayaw, Bellefontaine, OH (US); Richard Van Schaik, Galena, OH (US); Rex Hester, Bear Creek, NC (US)

(73) Assignee: IXIA, Calabasas, CA (US)

( * ) Notice: Subject to any disclaimer, the term of this patent is extended or adjusted under 35 U.S.C. 154(b) by 351 days.

(21) Appl. No.: 12/395,657

(22) Filed: Feb. 28, 2009

(65) Prior Publication Data

US 2010/0172246 A1 Jul. 8, 2010

Related U.S. Application Data

(60) Provisional application No. 61/143,050, filed on Jan. 7, 2009.

(51) Int. Cl.
*G01R 31/08* (2006.01)
*H04L 12/66* (2006.01)
(52) U.S. Cl. ........................................ 370/252; 370/352
(58) Field of Classification Search ........................ None
See application file for complete search history.

(56) References Cited

U.S. PATENT DOCUMENTS

| | | | |
|---|---|---|---|
| 7,352,705 B1 | 4/2008 | Akshay | |
| 2002/0145979 A1 | 10/2002 | Michael | |
| 2003/0093513 A1 | 5/2003 | Hicks et al. | |
| 2006/0114920 A1 | 6/2006 | Edward et al. | |
| 2007/0011725 A1 | 1/2007 | Vasant et al. | |
| 2007/0147354 A1 | 6/2007 | He | |

(Continued)

FOREIGN PATENT DOCUMENTS

JP 2005-129981 A 5/2005

(Continued)

OTHER PUBLICATIONS

Notification of Transmittal of the International Search Report and the Written Opinion of the International Searching Authority, or the Declaration for International Application No. PCT/US2010/020394 (Aug. 16, 2010).

(Continued)

*Primary Examiner* — Kwang B Yao
*Assistant Examiner* — Jutai Kao
(74) *Attorney, Agent, or Firm* — Jenkins, Wilson, Taylor & Hunt, P.A.

(57) ABSTRACT

Methods, systems, and computer readable media for categorizing voice over Internet Protocol (VoIP) subscriber device numbers in accordance to test call results are disclosed. In one embodiment, a method includes creating a plurality of VoIP test call lists within a test call system and assigning VoIP subscriber device numbers to the plurality of VoIP test call lists. Each of VoIP subscriber device numbers is tested based on the test call list to which each of the VoIP subscriber device numbers is assigned, wherein each test call list corresponds to at least one of a test call type and a test call frequency associated with the test call list. The method also includes obtaining call quality data for at least one of the VoIP subscriber device numbers and automatically reassigning one or more of the VoIP subscriber device numbers to a different test call list based on at least one of results of the testing and the call quality data.

27 Claims, 6 Drawing Sheets

U.S. PATENT DOCUMENTS

| | | | |
|---|---|---|---|
| 2008/0031425 | A1 | 2/2008 | Fergal et al. |
| 2008/0102809 | A1 | 5/2008 | Beyer |
| 2009/0060495 | A1 | 3/2009 | Wurst et al. |
| 2010/0172251 | A1 | 7/2010 | Adam et al. |
| 2010/0266106 | A1 | 10/2010 | Adam et al. |

FOREIGN PATENT DOCUMENTS

| | | |
|---|---|---|
| KR | 10-2008-0073006 A | 8/2008 |
| WO | WO 2010/080927 A2 | 7/2010 |
| WO | WO 2010/080930 A2 | 7/2010 |

OTHER PUBLICATIONS

Notification of Transmittal of the International Search Report and the Written Opinion of the International Searching Authority, or the Declaration for International Application No. PCT/US2010/020391 (Aug. 13, 2010).

Notification of Transmittal of the International Search Report and the Written Opinion of the International Searching Authority, or the Declaration for International Application No. PCT/US2010/020390 (Aug. 13, 2010).

Commonly-assigned, co-pending U.S. Appl. No. 12/475,451, filed May 29, 2009.

"Series P: Telephone Transmission Quality, Telephone Installations, Local Line Networks; Methods for Objective and Subjective Assessment of Quality; Perceptual Evaluation of Speech Quality (PESQ): An Objective Method for End-to-End Speech Quality Assessment of Narrow-Band Telephone Networks and Speech Codecs," ITU-T P3862 (Feb. 2001).

Official Action for U.S. Appl. No. 12/475,451 (Apr. 15, 2011).

Configuration: Lists

Main Status: ⊘Running　　　　　　　　　　　　　　　　　　　　　　　[State] [Export]

⊘Automatic

| | |
|---|---|
| Number of Calls per Day: 5000 | [State] |
| Run: ⊙ Continuous | [Set] |
| ○ From [12▼]:[00▼][AM▼] To [12▼]:[00▼][AM▼] | [Reset] |

302

⊘Error

Number of Calls per Day: 5000　　　　　　　　　　　　　　[State]
Run: ⊙ Continuous　　　　　　　　　　　　　　　　　　　　
　　　○ From [12▼]:[00▼][AM▼] To [12▼]:[00▼][AM▼]
Number of Days the Subscriber is in this List: 1　　　　　　[Set]
Number of Consecutive Passes to Return to Routine List: 1　[Reset]

304

⊘New

Number of Calls per Day: 1584　　　　　　　　　　　　　　[State]
Run: ⊙ Continuous
　　　○ From [12▼]:[00▼][AM▼] To [12▼]:[00▼][AM▼]
Number of Days the Subscriber is in this List: 15　　　　　　[Set]
Percentage of Errors to Move to Error upon Expiration: 5 %　[Reset]

306

⊘On Demand

Number of Calls per Day: 50000　　　　　　　　　　　　　[State]
Run: ⊙ Continuous　　　　　　　　　　　　　　　　　　　　[Set]
　　　○ From [12▼]:[00▼][AM▼] To [12▼]:[00▼][AM▼]　[Reset]

308

⊘Routine

Number of Calls per Day: 2880　　　　　　　　　　　　　　[State]
Run: ⊙ Continuous　　　　　　　　　　　　　　　　　　　　[Set]
　　　○ From [12▼]:[00▼][AM▼] To [12▼]:[00▼][AM▼]　[Reset]

310

⊘Topology

Number of Calls per Day: 5000　　　　　　　　　　　　　　[State]
Run: ⊙ Continuous　　　　　　　　　　　　　　　　　　　　[Set]
　　　○ From [12▼]:[00▼][AM▼] To [12▼]:[00▼][AM▼]　[Reset]

312

⊘Trouble

Number of Calls per Day: 288　　　　　　　　　　　　　　　[State]
Run: ⊙ Continuous
　　　○ From [12▼]:[00▼][AM▼] To [12▼]:[00▼][AM▼]
Number of Days the Subscriber is in this List: 1　　　　　　[Set]
　　　　　　　　　　　　　　　　　　　　　　　　　　　　[Reset]

| Subscribers | | | | | | | |
|---|---|---|---|---|---|---|---|
| | | | | Results 1 - 50 of 368 <br> [1] [2] [3] [4] [5] [6] [7] [8] | | | |
| S | Number | List | Topology | Baseline | Last | Moved to List | Added to System | Actions |
| ⊘ | 9732310152⟩ | New | demo.BUSS.459 | ▨ 4.1016 on 09/30/2008 @ 04:35:55 PM ⟩ | ▨ 4.1900 on 11/24/2008 @ 11:14:39 AM ⟩ | 09/05/2008 | 09/05/2008 @ 11:49:58 AM | Edit Delete State <br> Reset |
| ⊘ | 9732310221⟩ | Error | demo.BUUN.636 | ▨ 3.8813 on 09/14/2008 @ 12:55:22 AM ⟩ | ☐ 0.0000 on 11/24/2008 @ 11:38:46 AM ⟩ | 11/24/2008 | 09/05/2008 @ 11:49:58 AM | Edit Delete State <br> Reset |
| ⊘ | 9732310231⟩ | Error | demo.BUUN.636 | ▨ 4.2764 on 09/08/2008 @ 09:22:23 PM ⟩ | ☐ 0.0000 on 11/24/2008 @ 11:39:55 AM ⟩ | 11/24/2008 | 09/05/2008 @ 11:49:58 AM | Edit Delete State <br> Reset |
| ⊘ | 9732310279⟩ | New | demo.BUSS.459 | ☐ 0.7035 on 09/08/2008 @ 07:08:28 PM ⟩ | ☐ 0.0000 on 11/24/2008 @ 11:17:23 AM ⟩ | 09/05/2008 | 09/05/2008 @ 11:49:58 AM | Edit Delete State <br> Reset |
| ⊘ | 9732310407⟩ | Error | demo.BUUN.637 | ▨ 2.4749 on 10/17/2008 @ 09:58:55 AM ⟩ | ▨ 3.2130 on 11/24/2008 @ 11:36:11 AM ⟩ | 11/23/2008 | 09/05/2008 @ 11:49:58 AM | Edit Delete State <br> Reset |
| ⊘ | 9732310431⟩ | Error | demo.BUUN.638 | ▨ 4.1898 on 09/08/2008 @ 09:40:53 PM ⟩ | ▨ 4.0197 on 11/24/2008 @ 11:43:57 AM ⟩ | 11/24/2008 | 09/05/2008 @ 11:49:58 AM | Edit Delete State <br> Reset |
| ⊘ | 9732310498⟩ | Error | demo.BUSS.461 | ▨ 3.8030 on 09/14/2008 @ 01:13:22 AM ⟩ | ▨ 3.6447 on 11/24/2008 @ 11:40:30 AM ⟩ | 11/24/2008 | 09/05/2008 @ 11:49:58 AM | Edit Delete State <br> Reset |
| ⊘ | 9732310522⟩ | Routine | demo.BUSS.461 | ▨ 3.5124 on 09/08/2008 @ 06:42:43 PM ⟩ | ▨ 4.1010 on 11/10/2008 @ 07:31:09 PM ⟩ | 11/10/2008 | 09/05/2008 @ 11:49:58 AM | Edit Delete State <br> Reset |

500
METHODS, SYSTEMS, AND COMPUTER READABLE MEDIA FOR AUTOMATICALLY CATEGORIZING VOICE OVER INTERNET PROTOCOL (VOIP) SUBSCRIBER DEVICES IN ACCORDANCE WITH VOIP TEST AND CALL QUALITY DATA

RELATED APPLICATIONS

This application claims the benefit of U.S. Provisional Patent Application Ser. No. 61/143,050, filed Jan. 7, 2009; the disclosure of which is incorporated herein by reference in its entirety.

TECHNICAL FIELD

The subject matter described herein relates to voice over Internet protocol (VoIP) test call data. More specifically, the subject matter relates to methods, systems, and computer readable media for automatically categorizing voice over Internet Protocol (VoIP) subscriber devices in accordance with VoIP test and call quality data are disclosed.

BACKGROUND

Voice over Internet protocol (VoIP) implementations enable voice traffic, such as telephone calls, to be carried over Internet protocol (IP) communications networks. This allows voice calls to use the reduced transmission cost associated with packet switched networks to carry information once exclusively carried over more expensive conventional circuit switched networks. For example, during a VoIP call the voice signal from a user is compressed and packetized using one or more of a variety of applicable protocols so as to be suitable for being transmitted using a packet switched communications network to a called party. When the VoIP packets are received at their destination, the voice signal is decompressed before being played to the called party. The specific path that the packets take over the packet switched communications network is not specified and can be any suitable path that is available. Thus, a VoIP call between the same origin and destination may take different actual paths through the communications network.

As a result, voice call quality for VoIP calls may vary more than conventional calls transmitted using a circuit switched network. Specifically, speech quality of VoIP calls may be affected by factors such as delay, jitter, and packet loss. Additionally, service providers may enter into contracts with customers to provide specified levels of speech quality between specified end points.

In order to accurately quantify varying speech quality levels, many different measures of speech quality have been used for monitoring speech quality for VoIP calls. Consequently, both objective and subjective measures of voice quality have been developed to ensure that the specified voice quality is being met. Objective measures of speech quality, such as measures used for determining the number of packets dropped, can be utilized as an indicator of speech quality. However, because speech quality is perceived by human users rather than machines, subjective measures of speech quality have been developed. Subjective speech quality measures include, for example, a mean opinion score (MOS). A MOS for a call may be determined by the judgments of the voice quality of a call gathered from a wide range of listeners, and may be expressed on a scale of 1 (poor) to 5 (excellent).

Recently, an algorithm known as perceptual evaluation of speech quality (PESQ) has been developed and is capable of accounting for filtering, variable delay and short localized distortions of packetized voice calls. Hence, PESQ is a popular measure of end-to-end voice quality over packet switched networks. PESQ compares an original signal x(t) with a degraded signal y(t), which is the result of passing x(t) through a communications system. The output of PESQ is a prediction of the perceived quality that would be given to y(t) from subjects participating in a subjective listening test. When PESQ or similar algorithms are used to measure speech quality, a dedicated voice call is set up to transmit only test speech signals over a communications network. This enables the test voice signals to be easily identified and provides a means of determining the amount of degradation that occurs as a result of transmission over the network. PESQ provides an estimated MOS of the speech quality and is described in international telecommunications union (ITU) recommendation P.862, the contents of which are incorporated herein by reference in its entirety.

Although nearly all existing test call systems are adapted to make test calls to a telecommunications service provider's subscribers, a significant number of these systems lack the ability to dynamically characterize the customers and test associated subscriber device numbers accordingly. Instead, a network operator is compelled to manually monitor and analyze PESQ scores derived from the test call to determine if additional (or less) test call generation associated with a particular subscriber is necessary. After assessing that further call testing is not required, a network operator typically removes the subscriber device number from the test call list on a manual basis.

Accordingly, in light of these shortcomings, a need exists for improved methods, systems, and computer readable media for automatically categorizing voice over Internet Protocol (VoIP) subscriber devices in accordance with VoIP test and call quality data are disclosed.

SUMMARY

Methods, systems, and computer readable media for categorizing voice over Internet Protocol (VoIP) subscriber device numbers in accordance to test call results are disclosed. In one embodiment, a method includes creating a plurality of VoIP test call lists within a test call system and assigning VoIP subscriber device numbers to the plurality of VoIP test call lists. Each of VoIP subscriber device numbers is tested based on the test call list to which each of the VoIP subscriber device numbers is assigned, wherein each test call list corresponds to at least one of a test call type and a test call frequency associated with the test call list. The method also includes obtaining call quality data for at least one of the VoIP subscriber device numbers and automatically reassigning one or more of the VoIP subscriber device numbers to a different test call list based on at least one of results of the testing and the call quality data.

The subject matter described herein for categorizing VoIP subscriber devices for VoIP equipment testing may be implemented using a computer readable medium having stored thereon executable instructions that are executed by a computer processor. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for categorizing VoIP subscriber devices described herein. In addition, a computer readable medium that implements the subject matter described herein may be distributed across multiple physical devices and/or computing platforms.

The subject matter described herein for categorizing VoIP subscriber devices for VoIP equipment testing can be implemented on a particular machine, such as a computer having a processor programmed to execute the steps for implementing the subject matter described herein.

BRIEF DESCRIPTION OF THE DRAWINGS

The subject matter described herein will now be explained with reference to the accompanying drawings of which.

DETAILED DESCRIPTION

Figure 1:
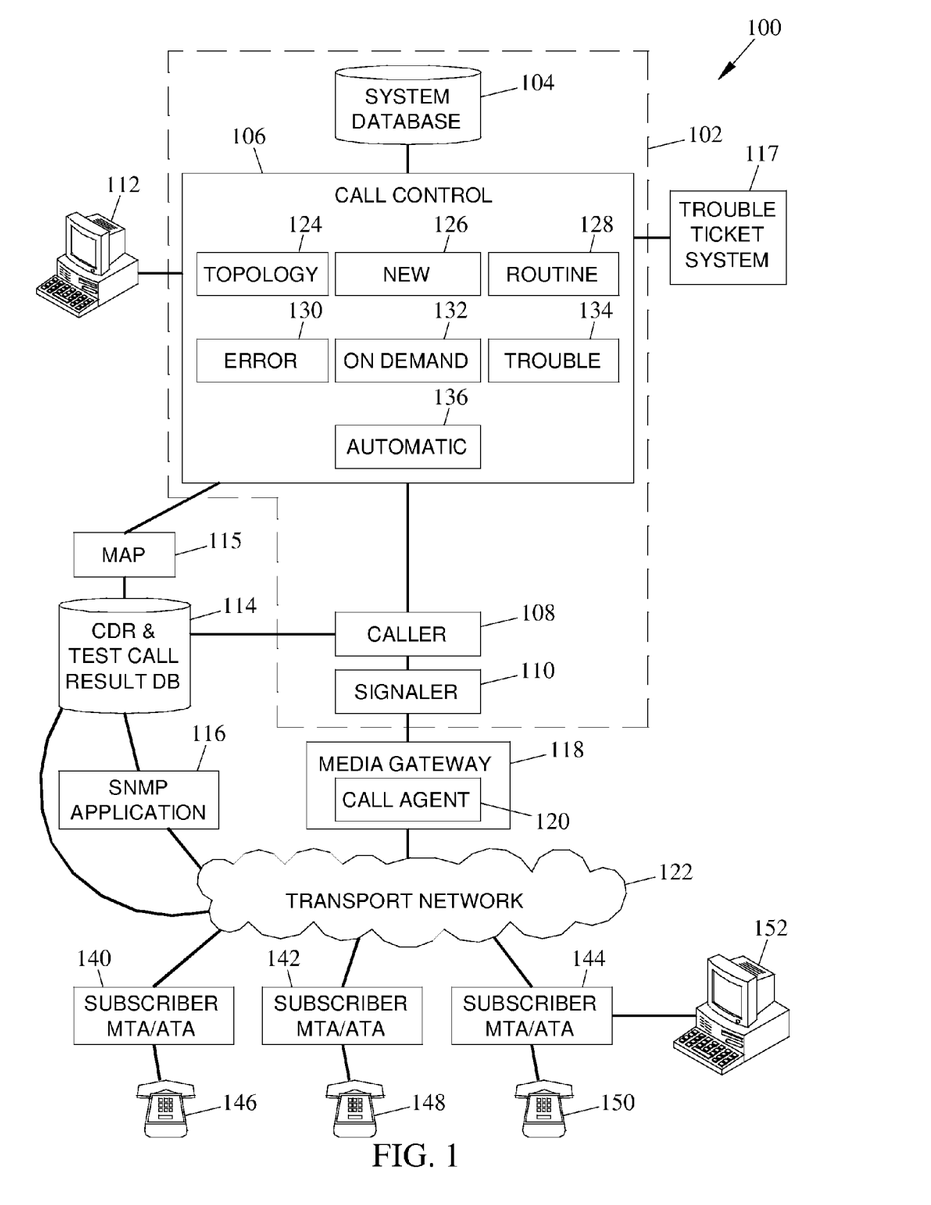
FIG. 1 is a block diagram of an exemplary system for automatically categorizing VoIP subscriber devices for VoIP equipment testing according to an embodiment of the subject matter described herein.

FIG. 1 depicts a telecommunications network 100 that includes a test call system 102, a transport network 122, a plurality of subscriber terminal adapters 140-144, and a plurality of subscriber endpoint devices 146-152. Test call system 102 may be used by a telecommunications service provider to generate and analyze test calls intended for testing the connections to subscriber endpoint devices 146-152. For example, the test calls may be monitored by test call system 102 in order to detect poor voice path connections experienced by subscriber endpoint devices 146-152. In one embodiment, test call system 102 includes a system database 104, a call control application 106, a caller application 108, and a signaler application 110. Test call system 102 may also be communicatively coupled to a network operator interface 112, a test call results database 114, a trouble ticket system 117, and one or more external applications (e.g., a MAP application 115 that provides test call and call detail record (CDR) status for network elements and subscribers). Network operator interface 112 may include a computing device, such as a personal computer or personal digital assistant, for executing an application (e.g., software application, web browser, etc.) that can be used for communicating with test call system 102. Trouble ticket system 117 may include a customer trouble ticket system that is configured to collect trouble tickets in telecommunications network 100. MAP application 115 may include any external application that provides test call data, CDR data, and/or instructions for automated test call generation to system 102. Test call results database 114 may include any form of database supported by a host computer that is responsible for storing call detail records (CDRs) and/or PESQ scores associated with test calls. Each of these components is discussed in greater detail below.

Within test call system 102, call control application 106 is responsible for initiating the test call process. In one embodiment, call control application 106 contains a plurality of test lists 124-136. Each test list may comprise a plurality of subscriber device numbers (each of which includes a bit field that identifies the list(s) the subscriber device number is assigned). Each test list may include certain parameters that set forth the frequency (i.e., the call rate) in which its listed subscriber device numbers are test called, the specific start and stop times of periods which the test calls are made, the type of test call(s) to be made, as well as the conditions for a subscriber device number to be added to, deleted from, or remain on a test list. In one embodiment, test lists 124-136 may be stored in the memory accessible by call control application 106. Notably, call control application 106 may be configured to receive call requests from test lists 124-136. Call control application 106 may also be responsible for ensuring that network resources are available for the request test calls (e.g., ensuring that a daily test call limit is not exceeded). In one embodiment, call control application 106 may be responsible for the creation of test lists 124-136.

Images of test lists 124-136 may also exist in system database 104 for backup or reboot purposes. In one embodiment, system database 104 stores the test list information which may be updated accordingly as changes occur in lists 124-136. For example, new subscriber list 128 includes a list of subscriber device numbers that have recently subscribed to the call services provided by the telecommunications service provider employing test call system 102. Because the initial subscription period (e.g., the first 15 or 30 days) is critical for making an impression on a new subscriber, a telecommunications service provider is normally interested in ensuring the new subscriber's service is more than satisfactory. If the call service is poor during this time period, a new subscriber may be compelled to return to a former service provider. Consequently, it is in the telecommunications service provider's best interest to frequently test and monitor the voice quality of a new subscriber's connection. Thus, new subscriber list 128 may be configured so that a higher number of test calls are made to the subscriber device numbers on the list for a predetermined number of days (e.g., as compared to the call rate of "routine list" test calls). After the predetermined time period, the subscriber device number is moved by call control application 106 to a different test list. For example, after a predetermined duration expires (e.g., 15 days), the number of test call failures associated with each new subscriber device number is determined. If the percentage of test call failures exceeds a user configurable threshold (e.g., 5 percent), then the subscriber device number may be moved to error list 130. Otherwise, the subscriber device number may be transferred to routine list 126 by call control application 106.

Routine list 126 is a test list containing subscriber device numbers, which are subjected to normal subscriber testing. For example, normal subscriber testing may include generating a test call for a subscriber device number once every 3 days. In one embodiment, routine list 126 may include numbers of subscriber devices that have been deployed for more than one month. Routine list 126 may be configured so that a subscriber device number remains on the list until a test call registers a certain PESQ score (e.g., a low PESQ score that falls below a particular threshold level). In the case where a test call registers a low PESQ score, the subscriber device number may be moved to error list 130 call control application 106.

Error list 130 is a test list containing subscriber device numbers that have encountered one or more test call failures. In one embodiment, once a subscriber device number is moved to error list 130, the number is not removed from the list until a configuration setting is reached. A configuration setting for error list 130 may include, for example, the expiration of a predefined number of days or until a predetermined number of successful test calls are consecutively made to the listed subscriber device number. After the configuration setting is reached, the subscriber device number may be moved to routine list 126 by call control application 106.

On demand list 132 is a test list containing subscriber device numbers that have been selected for testing by a network operator. In one embodiment, a network operator may manually enter a test call request by using interface 112 to enter a subscriber device number and selecting the call rate and type of test calls (e.g., a loopback test call or a continuity test call) to be made to the entered number. For example, the network operator may use on demand list 132 to request 10 repeated loopback test calls to a subscriber device number.

Topology list 124 is a test list containing a particular grouping of subscriber device numbers based on geographical location for testing by a network operator. In one embodiment, topology list 124 is a test list used by a network operator to select a particular topology that has been defined in the network (e.g., at least a portion of a designated service area). The network operator may then select a percentage of the subscriber device numbers in the selected topology (i.e., geographic area) to receive test calls. In one embodiment, topology list 124 may be used for testing up or across the "network tree" to determine where a voice path fault starts or stops. Topology list 124 may also act as a traffic limiting tool so that users do not overload the network with test calls.

Automatic list 136 is a test list containing subscriber device numbers that have been automatically selected for testing by an application or program. For example, automatic list 136 may be prompted by an external application (e.g., MAP application 115) to instruct call control application 106 to make test calls to a list of provided subscriber device numbers. In one embodiment, MAP application 115 receives call quality data, such as call detail records (CDRs), which are associated with normal call activity of subscriber endpoint devices 146-152, from any number or network elements (e.g., a network switch or SNMP application 116). When MAP application 115 receives CDRs from the network, the IP metrics contained in each CDR are analyzed. If the IP metrics indicate that the voice quality associated with calls to or from a subscriber device number is poor, the subscriber device number is forwarded to automatic list 136. Like the other test lists, automatic list 136 may be characterized by a particular test call frequency as well as conditions for removing a subscriber device number from list 136. For example, automatic list 136 may include parameters indicating that a test call may be made every hour to a subscriber device number that appears on automatic list 136 and the subscriber device number may not be removed from automatic list 136 until a measured PESQ score exceeds a threshold value checked by MAP application 115.

Trouble list 134 is a test list containing subscriber device numbers that have been automatically selected for testing by trouble ticket system (e.g., a test list containing subscriber device numbers that have been selected for testing in response to receiving a trouble ticket from the trouble ticket system). In one embodiment, test call system 102 is adapted to interface with one or more customer trouble ticketing systems (e.g., trouble ticket system 117) operated by the telecommunications service provider. Typically, a trouble ticket is created when a subscriber is experiencing problems with service. If a trouble ticket is created and forwarded to test call system 102, call control application 106 may be adapted to move the subscriber device number from a previous list (e.g., routine list 126) to trouble list 134. The subscriber device number remains on trouble list 134 until the trouble ticket is cleared (i.e., resolved). After the trouble ticket is cleared, trouble ticket system 117 informs call control application 106, which then initiates a test call(s) to the subscriber device number to confirm that the trouble condition is resolved. After a predefined number of test calls over a predetermined period, call control application 106 may move the subscriber device number back to routine list 126. In an alternate embodiment, the subscriber device numbers in trouble list 134 may be manually moved by a network operator.

As previously discussed, test call system 102 utilizes the aforementioned test lists to conduct test calls in telecommunications network 100. In one embodiment, test call system 102 initiates a test call to a subscriber device number via call control application 106. Specifically, call control application 106 may obtain test call requests, which include the subscriber device numbers from test lists 124-136. For each test list, call control application 106 is also configured to apply certain test list parameters, which are associated with each respective test list, to each test call directed to a subscriber device number during the test call initiation process. For example, the test list parameters for each test list may include the type of test call to generate (e.g., loopback or continuity test), the frequency in which test calls are to be made, the specific start and stop times for test calling, the minimum or maximum number of test calls that can be made during a given time period, and other calling criteria that is unique to a given test list. Call control application 106 is also responsible for analyzing the PESQ scores derived from the test calls as well as moving subscriber device numbers between test lists 124-136.

According to one embodiment, call control application 106 provides the subscriber device number and test list parameters to caller application 108. Caller application 108 is a system component responsible for processing the call instructions and making a test call to a subscriber device number. In one embodiment, caller application 108 provides the subscriber device number to signaler application 110, which is the system component that provides a means for generating the test call. Signaler application 110 may include a software program or module that interacts with the interface (e.g., a media gateway 118) to the network to be tested in order to direct the test call to the proper subscriber terminal adapter. In one embodiment, signaler application 110 communicates with media gateway 118 via a signaling network and/or a TDM or packet voice network. Once a test call is generated by signaler application 110, the test call is received over voice trunks by media gateway 118, which then directs the test call to a terminal adapter associated with the intended subscriber device number via transport network 122. In one embodiment, media gateway 118 may include a softswitch, media gateway controller, or any other network element capable of converting telecommunications protocols. Although media gateway 118 in FIG. 1 is shown as an external interface connecting transport network 122 to test call system 102, media gateway 118 may be positioned within transport network 122 in an alternate embodiment. Media gateway 118 may also include a call agent 120, which is responsible for processing call requests and setting up calls between media gateway 118 and test call system 102.

Once processed by media gateway 118, a test call traverses transport network 112 and received by one of terminal adapters 140-144. Terminal adapters 140-144 may include multimedia terminal adapters, analog telephony adapters, cable modems, or any like component (e.g., ADSL modem, SDSL, fiber modem, ATM modem, wireless modem, etc.) used to connect telecommunications devices to a digital telephone system. Although only three terminal adapters and four subscriber endpoint devices are depicted in FIG. 1, additional (or fewer) terminal adapters may be implemented without departing from the scope of the present subject matter. In one embodiment, the subscriber terminal adapter is signaled to execute a "loopback" of the voice path so that the test call's voice path is returned to test call system 102. The type of loopback procedure performed will depend on the terminal adapter receiving the test call loopback type in the signaling messages setting up the test call. For example, if the terminal adapter is an MTA, then the test call may comply with a network call signaling (NCS) loopback procedure. Similarly, if the terminal adapter is an ATA, then the test call may comply with an RTP loopback procedure. During the loopback procedure, the test call is received by caller application 108. In one embodiment, caller application 108 sends an initial wave file and then receives a wave file via the loopback at subscriber device. Caller application 108 then invokes a PESQ test function that processes the returned wave file and subsequently logs the resulting PESQ score for the call in test call result database 114. It is important to note that the test call is transparent to the subscriber. Notably, the test call does not ring the subscriber device and has no effect on the subscriber's service, thereby allowing test calls to be made at any time of the day.

Another important aspect of test call system 102 is the ability to transfer or move subscriber device numbers among test lists 124-136. In order to efficiently test the voice quality experienced by subscribers, the frequency and type of test calls must be adjusted by the telecommunications service provider in order to address various problems experienced by different subscribers. In one embodiment, test call system 102 performs this function by transferring and moving subscriber device numbers among test lists 124-136.

Figure 2:
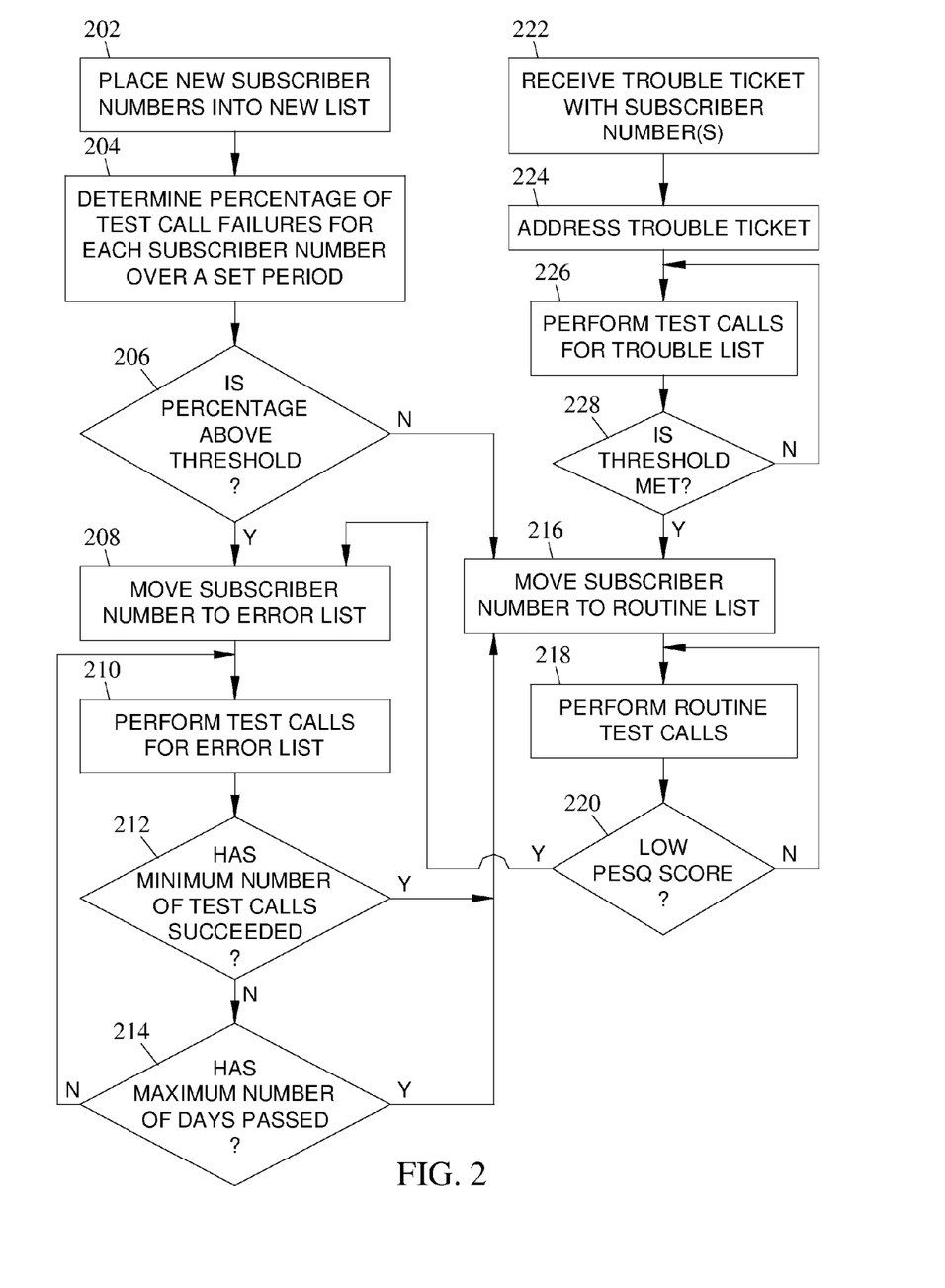
FIG. 2 is flow chart of exemplary steps for automatically categorizing and moving VoIP subscriber devices among test lists according to an embodiment of the subject matter described herein.

FIG. 2 depicts a flow chart of an exemplary method 200 for categorizing and moving VoIP subscriber devices among test lists according to one embodiment of the present subject matter. In block 202, new subscriber device numbers are placed into a new subscriber list. In one embodiment, a subscriber records file containing subscriber device numbers is imported into call control application 106 of test call system 102. Call control application 106 subsequently detects the new subscriber device numbers in the subscriber records file that are not currently configured in the system and places the numbers in new subscriber list 126.

In block 204, the percentage of test call failures for each subscriber device number over a predefined period is determined. In one embodiment, call control application 106 is configured to store new subscriber device numbers in new subscriber list 126 for a period predefined by a network operator (per configurable parameters in list 126). For example, a network operator may use network interface 112 to configure new subscriber list 126 so that the list retains subscriber device numbers for 30 days. While the subscriber device numbers are contained in list 126, test call system 102 makes test calls to the subscriber device number according to the parameters associated with new list 126. For example, subscriber device numbers in list 126 may receive 50 test calls a day over the period of one month. Upon the expiration of the configurable time period (e.g., one month), call control application 106 ascertains the percentage of test call failures experienced by a subscriber device number while in new subscriber list 126. Call control application 106 then compares the percentage of test call failures to a preconfigured threshold value (e.g., 5%) associated with new subscriber list 126.

In block 206, a determination is made as to whether the percentage of test call failures exceeds the preconfigured threshold value. If the percentage of test call failures is above the threshold value (i.e., indicating unacceptable voice path quality), then method 200 continues to block 208 where the subscriber device number is moved by call control application 106 to error list 130. If the percentage of test call failures is equal to or less than the threshold value (i.e., indicating acceptable voice path quality), then method 200 continues to block 216 where the subscriber device number is moved by call control application 106 to routine list 128.

Once the subscriber device number is moved to error list 130 (block 208), method 200 proceeds to block 210 where test calls are performed. In one embodiment, call control application 106 initiates test calls in accordance to the test call type and test call frequency defined by error list 130. Error list 130 is also configured with parameters that dictate the maximum duration a subscriber device number remains on the list.

In block 212, a determination is made as to whether a minimum number of test calls have been successful. In one embodiment, call control application 106 compares the number of successful test calls made to a subscriber device number (over a configurable testing period) to a predefined threshold. If the number of successful test calls exceeds the threshold, method 200 proceeds to block 216. Otherwise, method 200 continues to block 214 where a second determination is made.

In block 214, a determination is made as to whether a maximum number of days have past since the subscriber device number has been placed in error list 130. In one embodiment, call control application 106 compares the number of days to a threshold configurable by the network operator. If the number of days matches or exceeds the time period threshold, method 200 proceeds to block 216. Otherwise, method 200 loops back to block 210.

In block 216, the subscriber device number is moved to routine list 128. Method 200 continues to block 218 where test calls are performed on the subscriber device numbers in accordance to the parameters (e.g., test call type, test call frequency, etc.) associated with routine list 128. In one embodiment, routine list 128 is configured to have call control application 106 initiate a defined number of test calls per day to routine list 128 subscriber device numbers.

In block 220, a determination is made as to whether or not a routine test call attains a low PESQ score. In one embodiment, call control application 106 compares the PESQ score of a test call with a predefined threshold that is configurable by a network operator. If the PESQ score is lower than the threshold level, then method 200 proceeds to block 208 (i.e., the subscriber device number is moved to error list 130). If the PESQ score is equal to or greater than the threshold level, then method 200 loops back to block 218 (i.e., the subscriber device number remains on routine list 128).

In block 222, a trouble ticket with subscriber number(s) is received. In one embodiment, call control application 106 receives one or more subscriber device numbers that have been designated as being associated with a trouble ticket. The call control application 106 may receive the trouble ticket number(s) directly from at least two sources. In one embodiment, a subscriber device number may be moved manually to trouble list 134 for any reason by a network operator. Alternatively, if test call system 102 is integrated with a customer trouble ticketing system (e.g., trouble ticket system 117), the subscriber device number may be moved to trouble list 134 when a trouble ticket is received from trouble ticket system 117, which subsequently notifies test call system 102. Once the subscriber device number is placed in trouble list 134, testing is halted for that number.

In block 224, the trouble ticket is addressed. In one embodiment, the subscriber device number remains on trouble list 134 for a predefined number of days, or until the trouble ticket is resolved. For example, when the trouble with the subscriber device number is resolved, trouble ticketing system 117 sends a message that indicates that the trouble ticket is cleared to call control application 106. In response, call control application 106 will begin making test calls accordingly. Alternatively, call control application 106 may be configured to move the subscriber device number from trouble list 134 to routine list 126 after a predetermined time period of testing at the rate configured for trouble list 134.

Figure 3:
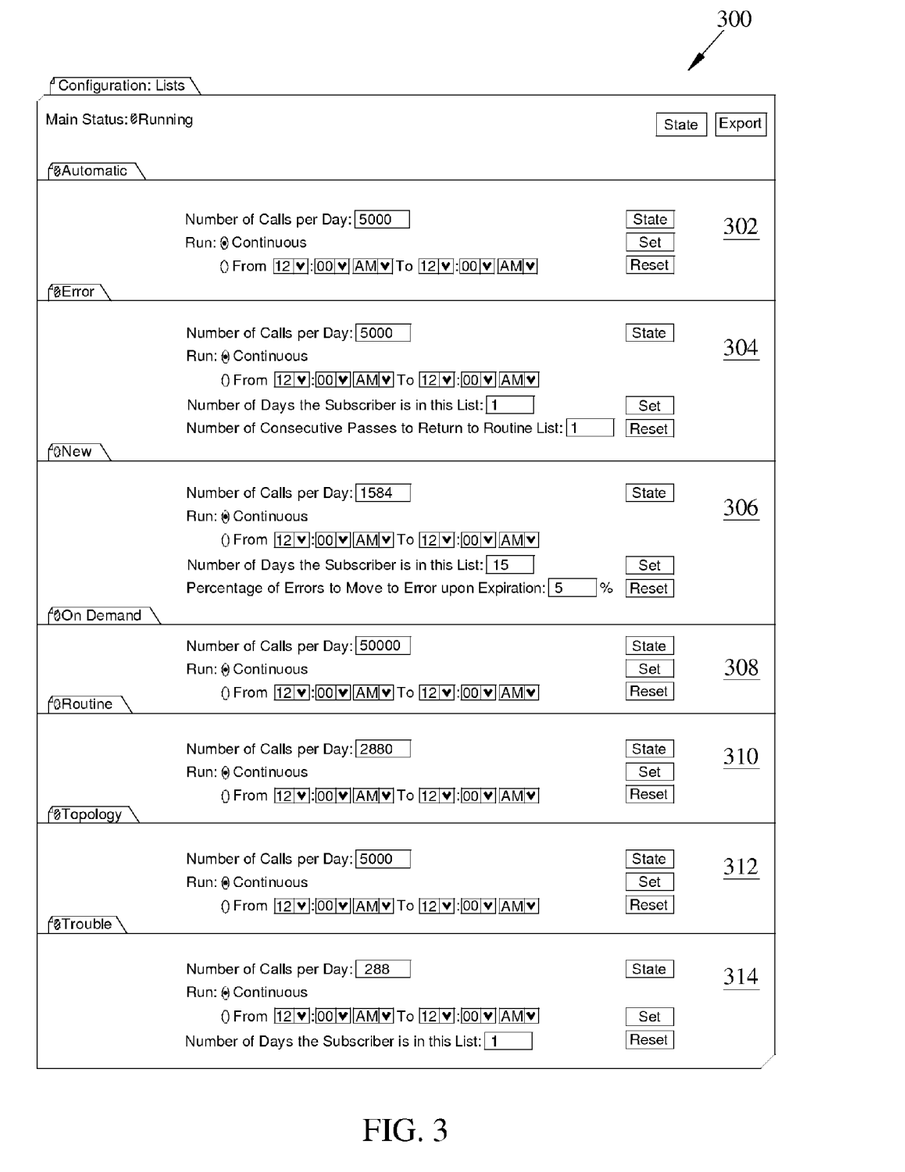
FIG. 3 is an exemplary computer screen display containing configurable test call parameters for a plurality of test lists according to an embodiment of the subject matter described herein.

To better demonstrate how test lists 124-136 function with test call system 102, FIGS. 3-6 illustrate exemplary computer screen displays associated with lists 124-136. In one embodiment, these screen displays may be viewed by a network operator via interface 112. Similarly, interface 112 may be used by a network operator to configure and monitor parameters of tests lists 124-136. FIG. 3 depicts an exemplary computer screen display 300 used to configure the test lists 124-136 contained in call control application 106, as shown in FIG. 1. For example, screen display 300 illustrates, for each of test list sections 302-314, a field for designating the number of test calls made per day and a selection tool to designate whether the test runs should be conducted on a continuous basis or for a designated time period (e.g., start and stop times). Several lists also include a field in which the number of days an assigned subscriber remains on the particular list. Error list section 304 also includes a field to configure the number of consecutive passing scores required to return the subscriber device number to the routine list. Similarly, new subscriber list section 306 includes a field to assign the percentage of errors (e.g., failed tests) to move a subscriber to the error list upon the list's configurable time expiration. Although FIG. 3 only shows test list sections 302-314, additional (or fewer) list sections and/or configurable fields may be employed without departing from the scope of the present subject matter.

Figure 4:
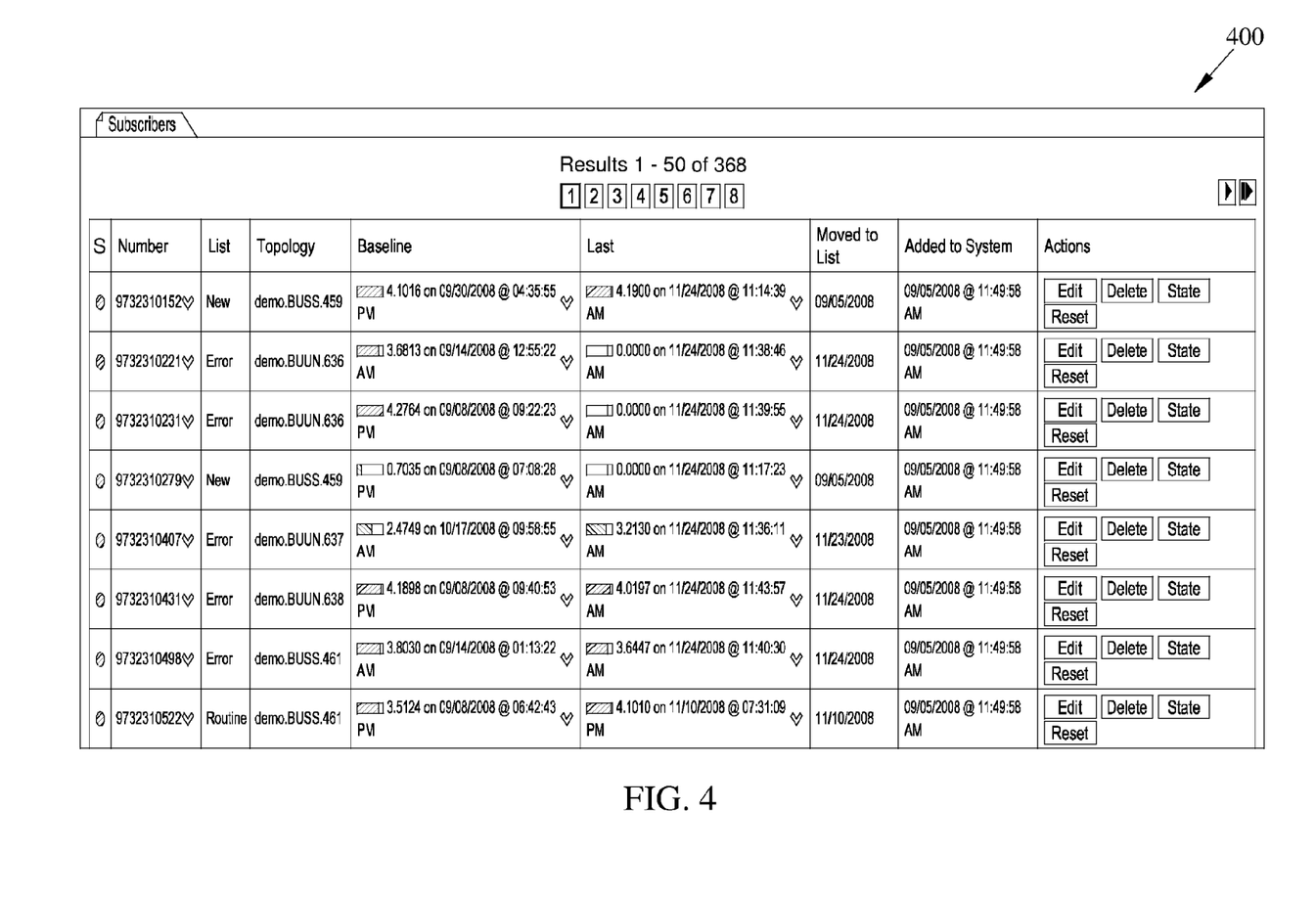
FIG. 4 is an exemplary computer screen display listing all subscriber device numbers cumulatively contained in all test lists according to an embodiment of the subject matter described herein.

FIG. 4 depicts an exemplary computer screen display 400 that shows a plurality of subscriber device numbers from various types of lists. For each subscriber device number, display 400 depicts the specific test list the subscriber device number belongs to, the topology the subscriber belongs to, an associated baseline PESQ score, a PESQ score of the last test call made, as well as information indicating when the subscriber was added to the system and moved to its current list. In addition, display 400 may also portray color coded graphical icons used to represent certain test score levels. According to one embodiment, display 400 may include a colored bar to visually represent a PESQ score level. A colored bar may assist a network operator to quickly ascertain the PESQ score status of numerous test scores at a quick glance, as opposed to reading each PESQ numerical score. According to one embodiment, a green colored bar may be used to indicate normal status (e.g., a satisfactory PESQ score) and the red colored bar may be used to indicate an error or failure (e.g., a failing PESQ score). Although only 8 subscriber device numbers and associated data are shown in FIG. 4, additional (or fewer) subscriber device numbers and data categories may be presented in display 400 without departing from the scope of the present subject matter.

Figure 5:
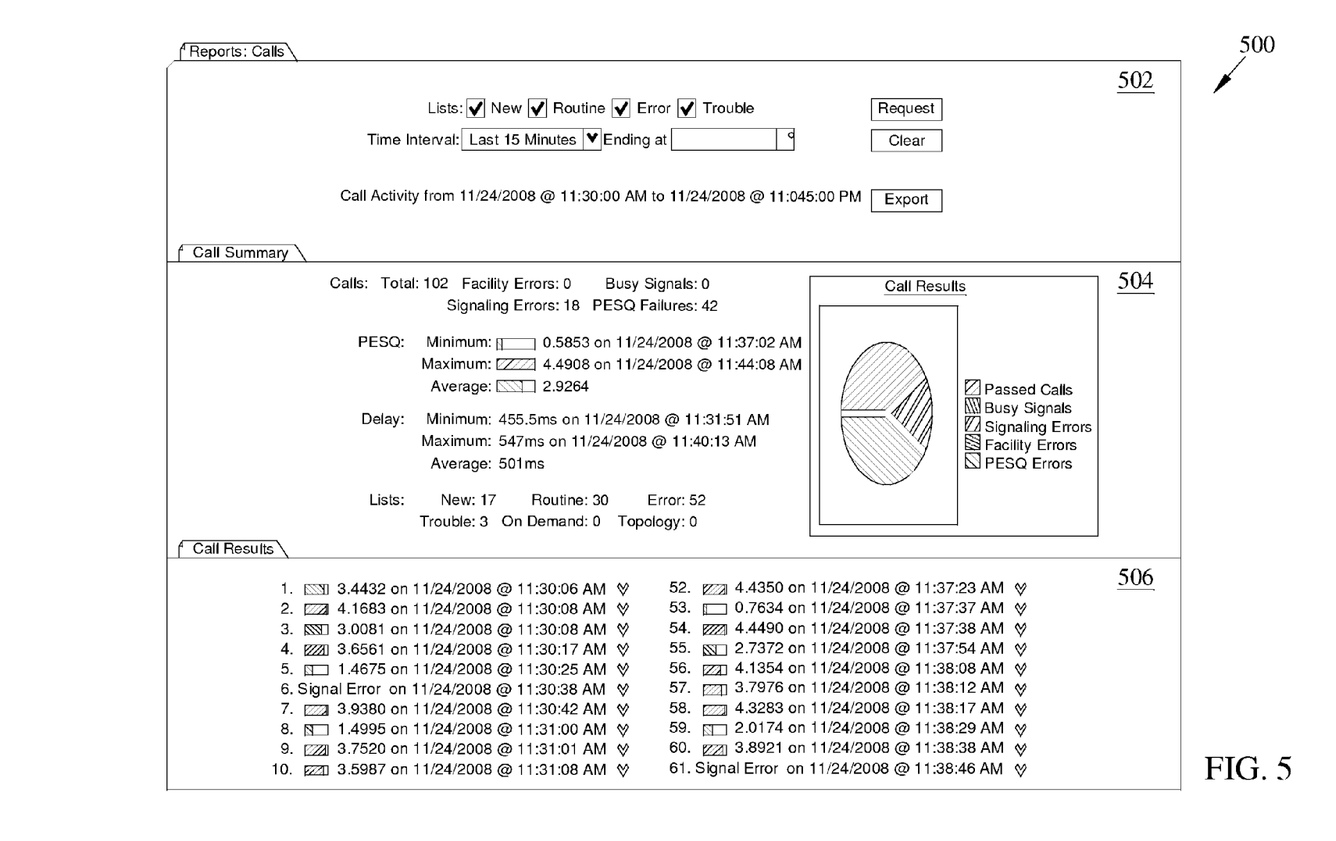
FIG. 5 is an exemplary computer screen display that contains test call results for designated test lists over a configurable duration according to an embodiment of the subject matter described herein.

FIG. 5 depicts an exemplary computer screen display 500 that shows a test call report. Display 500 may comprise a plurality of sections, including a call report section 502, a call summary section 504, and a call results section 506. Call report section 502 includes fields configurable by a network operator to designate test list types for reviewing test call activity conducted by test call system 102. Call report section 502 also includes one or more fields usable by a network operator to designate the time span of test calls to be reviewed. Call summary section 504 provides a summary of the types of errors and failures indicated by the test calls, a summary of PESQ scores, the duration of test call delays, and the number of the test calls made. Call results section 506 provides a listing and related information of all the test calls made. The listed information may include the PESQ score of the call, a graphical representation of the PESQ score, and the date and time of the test call. The graphical representation may be displayed in a manner similar to the color coded scheme detailed in the discussion of FIG. 4.

Figure 6:
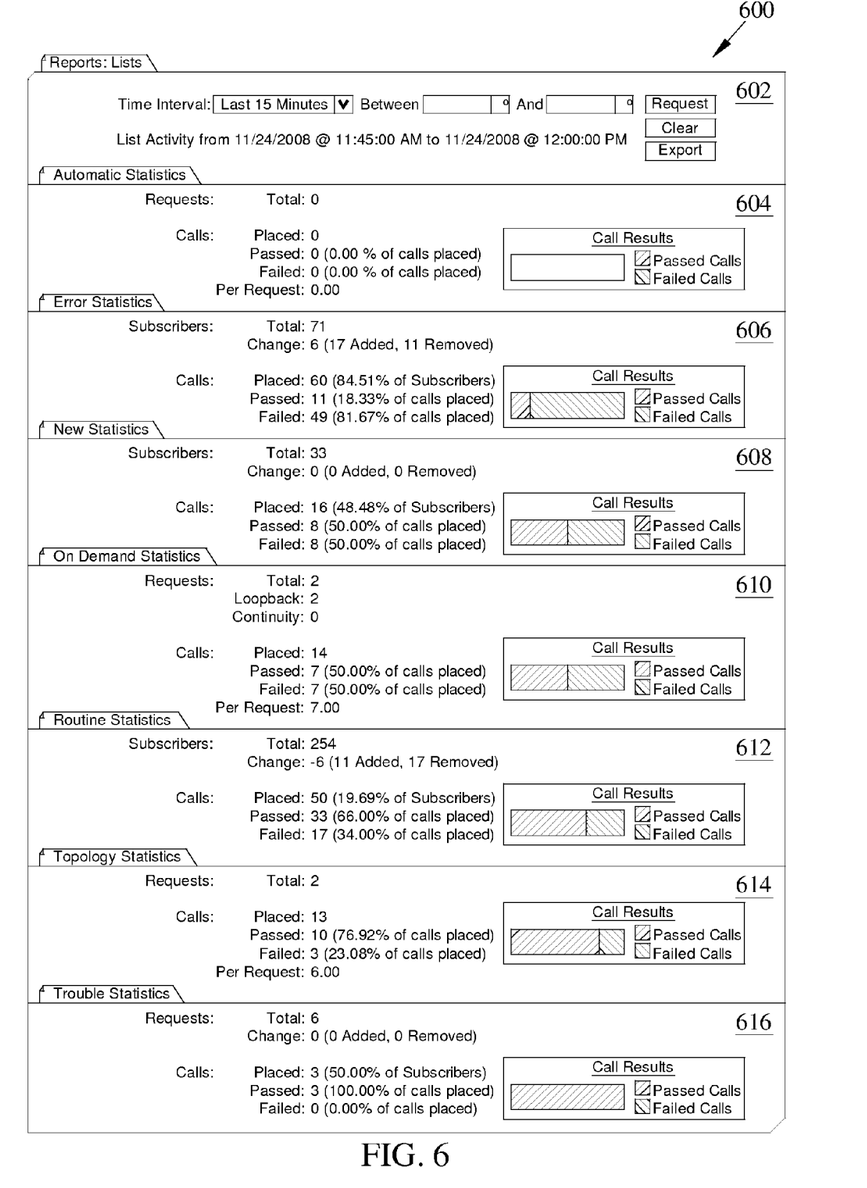
FIG. 6 is an exemplary computer screen display that contains a statistics summary for each test listing over a configurable duration according to an embodiment of the subject matter described herein.

FIG. 6 depicts an exemplary computer screen display 600 that shows a report summary for each test list. Display 600 may include a plurality of sections, such as a list report section 602, an automatic list statistics section 604, an error list statistics section 606, a new list statistics section 608, an on demand list statistics section 610, a routine list statistics section 612, a topology list statistics section 614, and a trouble list statistics section 616. List report section 602 includes a field configurable by the network operator to designate a time interval that contains reviewable test call statistics arranged by test lists. Each of the statistics sections 604-616 may list the number of request made, the number of subscribers that are test called, the number and/or percentage of test calls placed, the number and/or percentage of test calls that passed or failed, a graphical representation of the test call results (e.g., passed vs. failed test calls). The graphical representation may be displayed in a manner similar to the color coded scheme detailed in the discussion of FIG. 4.

In one embodiment, the functions for categorizing voice over Internet Protocol (VoIP) subscriber device numbers in accordance to test call results may be described as modules, applications or processes. It is understood that these modules or processes may be implemented as computer-executable instructions embodied in a computer-readable medium that may be executed by a processor to perform at least one method (e.g., method 200 detailed above). Alternatively, the modules or processes described herein may be implemented entirely in hardware. In yet another alternative embodiment, the modules or processes described herein may be implemented as a combination of hardware and software.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for categorizing voice over Internet Protocol (VoIP) subscriber device numbers in accordance to test call results, the method comprising:
   creating a plurality of VoIP test call lists within a test call system;
   assigning VoIP subscriber device numbers to the plurality of VoIP test call lists;

testing each of VoIP subscriber device numbers based on the test call list to which each of the VoIP subscriber device numbers is assigned, wherein each test call list corresponds to at least one of a test call type and a test call frequency associated with the test call list;

obtaining call quality data for at least one of the VoIP subscriber device numbers; and automatically reassigning one or more of the VoIP subscriber device numbers to a different test call list based on at least one of results of the testing and the call quality data.

2. The method of claim 1 wherein testing each of the VoIP subscriber device numbers includes generating a test call, to each VoIP subscriber device number, to determine a perceptual evaluation of speech quality (PESQ) score for a voice path associated with each of the VoIP subscriber device numbers.

3. The method of claim 1 wherein the plurality of VoIP test call lists includes a routine list, an error list, an on demand list, a trouble list, a new list, an automatic list, and a topology list.

4. The method of claim 3 wherein the new list includes a test list containing subscriber device numbers that are recently subscribed to call services provided by a telecommunications service provider, the routine list includes a test list containing subscriber device number that are subjected to normal subscriber testing, the error list includes a test list containing subscriber device numbers that have encountered at least one test call failure, the on demand list includes a test list containing subscriber device numbers that have been selected for testing by a network operator, the topology list includes a test list containing a grouping of subscriber device numbers based on a geographical location that has been selected for testing by a network operator, the automatic list includes a test list containing subscriber device numbers that are automatically selected for testing by a computer application, and the trouble list includes a test list containing subscriber device numbers that have been selected for testing in response to receiving a trouble ticket from the trouble ticket system or a test list containing subscriber device numbers manually moved by a network operator.

5. The method of claim 3 wherein automatically reassigning one or more of the VoIP subscriber device numbers includes transferring a VoIP subscriber device number between at least two of the routine list, the error list, the on demand list, the trouble list, the new list, the automatic list, and the topology list.

6. The method of claim 1 wherein automatically reassigning one or more of the VoIP subscriber device numbers includes transferring a VoIP subscriber device number from a first test call list to a second test call list after the VoIP subscriber device has been on the first test call list for a predefined time period.

7. The method of claim 1 wherein automatically reassigning one or more of the VoIP subscriber device numbers includes transferring a VoIP subscriber device number from a first test call list to a second test call list after a predefined number of test calls made to the VoIP subscriber device number are successful.

8. The method of claim 7 wherein a successful test call includes a test call that achieves a perceptual evaluation of speech quality (PESQ) score above a predetermined PESQ score threshold.

9. The method of claim 1 wherein automatically reassigning one or more of the VoIP subscriber device numbers includes transferring a VoIP subscriber device number from a first test list to a second test list after a predefined number of test calls made to the VoIP subscriber device number fail.

10. The method of claim 9 wherein a failed test call includes a test call that achieves a perceptual evaluation of speech quality (PESQ) score below a predetermined PESQ score threshold.

11. The method of claim 1 wherein the test call type includes at least one of a loopback test call and a continuity test call.

12. The method of claim 1 further comprising:
providing the VoIP subscriber device numbers to the test call system.

13. The method of claim 12 wherein providing the VoIP subscriber device numbers includes at least one of importing a subscriber records file containing the VoIP subscriber device numbers into the test call system and manually entering the VoIP subscriber device numbers into the test call system.

14. A test call system for categorizing voice over Internet Protocol (VoIP) subscriber device numbers in accordance to test call results, the test call system comprising:

a network operator interface device;

a call control application that when executed by the network operator interface device creates a plurality of VoIP test call lists within a test call system, assigns VoIP subscriber device numbers to the plurality of VoIP test call lists, and for automatically reassigns one or more of the VoIP subscriber device numbers to a different test call list based on at least one of the results of call tests and call quality data, and a caller application for generating test calls for testing each of VoIP subscriber device numbers based on the test call list to which each of the VoIP subscriber device numbers is assigned, wherein each test call list corresponds to at least one of a test call type and a test call frequency associated with the test call list, and obtaining the call quality data for at least one of the VoIP subscriber device numbers.

15. The test call system of claim 14 wherein the caller application is configured to generate a test call to determine a perceptual evaluation of speech quality (PESQ) score for a voice path associated with each of the VoIP subscriber device numbers.

16. The test call system of claim 14 wherein the plurality of VoIP test call lists includes a routine list, an error list, an on demand list, a trouble list, a new list, an automatic list, and a topology list.

17. The test call system of claim 16 wherein the new subscriber list includes a test list containing subscriber device numbers that are recently subscribed to call services provided by a telecommunications service provider, the routine list includes a test list containing subscriber device number that are subjected to normal subscriber testing, the error list includes a test list containing subscriber device numbers that have encountered at least one test call failure, the on demand list includes a test list containing subscriber device numbers that have been selected for testing by a network operator, the topology list includes a test list containing a grouping of subscriber device numbers based on a geographical location that has been selected for testing by network operator, the automatic list includes a test list containing subscriber device numbers that are automatically selected for testing by a computer application, and the trouble list includes a test list containing subscriber device numbers that have been selected for testing in response to receiving a trouble ticket from the trouble ticket system or a test list containing subscriber device numbers manually moved by a network operator.

18. The test call system of claim 16 wherein the call control application is configured to transfer a VoIP subscriber device number between at least two of the routine list, the error list, the on demand list, the trouble list, the new list, the automatic list, and the topology list.

19. The test call system of claim 14 wherein the call control application is configured to transfer a VoIP subscriber device number from a first test call list to a second test call list after the VoIP subscriber device has been on the first test call list for a predefined time period.

20. The test call system of claim 14 wherein the call control application is configured to transfer a VoIP subscriber device number from a first test call list to a second test call list after a predefined number of test calls made to the VoIP subscriber device number are successful.

21. The test call system of claim 20 wherein a successful test call includes a test call that achieves a perceptual evaluation of speech quality (PESQ) score above a predetermined PESQ score threshold.

22. The test call system of claim 14 wherein the call control application is configured to transfer a VoIP subscriber device number from a first test list to a second test list after a predefined number of test calls made to the VoIP subscriber device number fail.

23. The test call system of claim 22 wherein a failed test call includes a test call that achieves a perceptual evaluation of speech quality (PESQ) score below a predetermined PESQ score threshold.

24. The test call system of claim 14 wherein the test call type includes at least one of a loopback test call and a continuity test call.

25. The test call system of claim 14 wherein the call control application is further adapted to receive the VoIP subscriber device numbers as test call input.

26. The test call system of claim 25 wherein the test call input includes at least one of a subscriber records file containing the VoIP subscriber device numbers and manual entries of the VoIP subscriber device numbers.

27. A non-transitory computer readable medium having stored thereon computer executable instructions that when executed by a processor of a computer performs steps comprising:

creating a plurality of VoIP test call lists within a test call system;

assigning VoIP subscriber device numbers to the plurality of VoIP test call lists;

testing each of VoIP subscriber device numbers based on the test call list to which each of the VoIP subscriber device numbers is assigned, wherein each test call list corresponds to at least one of a test call type and a test call frequency associated with the test call list;

obtaining call quality data for at least one of the VoIP subscriber device numbers; and automatically reassigning one or more of the VoIP subscriber device numbers to a different test call list based on at least one of results of the testing and call quality data.

* * * * *